No. 883,677. PATENTED MAR. 31, 1908.
E. C. WASHBURN.
BUMPER BEAM DRAFT RIGGING.
APPLICATION FILED AUG. 12, 1907.
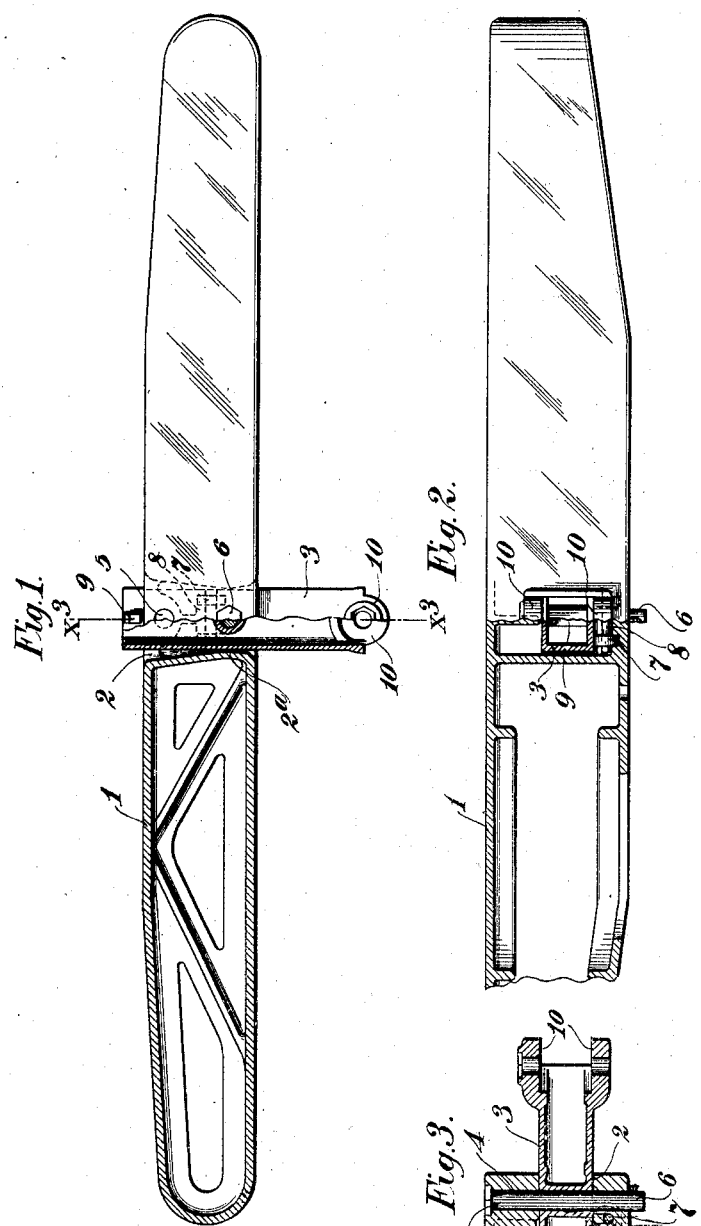

UNITED STATES PATENT OFFICE.

EDWIN C. WASHBURN, OF MINNEAPOLIS, MINNESOTA.

BUMPER-BEAM DRAFT-RIGGING.

No. 883,677.　　　Specification of Letters Patent.　　Patented March 31, 1908.

Application filed August 12, 1907. Serial No. 388,105.

*To all whom it may concern:*

Be it known that I, EDWIN C. WASHBURN, a citizen of the United States, residing at Minneapolis, in the county of Hennepin and State of Minnesota, have invented certain new and useful Improvements in Bumper-Beam Draft-Riggings; and I do hereby declare the following to be a full, clear, and exact description of the invention, such as will enable others skilled in the art to which it appertains to make and use the same.

My present invention has for its object to improve that type of draft rigging wherein the coupler bar is connected to and has its base of reaction against a bumper beam.

To the above ends, the invention consists of the novel devices and combinations of devices hereinafter described and defined in the claims.

Certain of the features of the construction herein disclosed are set forth and claimed broadly in the companion application S. N. 388,104, filed of even date herewith, and entitled "Bumper Beam Draft Rigging."

In the accompanying drawings which illustrate the invention, like characters indicate like parts throughout the several views.

Referring to the drawings, Figure 1 is a view partly in plan and partly in horizontal section, showing my invention incorporated in the bumper beam and draft bar. Fig. 2 is a view partly in front elevation and partly in vertical section, with some parts broken away, showing the parts illustrated in Fig. 1; and Fig. 3 is a vertical section taken on the line $x^3 x^3$ of Fig. 1.

The bumper beam 1 is made hollow, being preferably cast in steel. At its central portion it is provided with a draft bar seat 2 that extends through the beam from front to rear thereof, and the side walls of which diverge in a rearward direction and preferably also in a forward direction from points marked $2^a$, which points are relatively close to the front face of the said beam.

The draft bar 3, which is short, is also preferably cast hollow in steel. This draft bar is seated in and extends through the draft bar seat 2, and is mounted therein with freedom for lateral oscillatory movements and for longitudinal endwise adjustments. Said bumper beam is formed with two vertically extended coupling pin seats 4—5, the latter of which is located at the rear of the former. A coupling pin 6, which is extended through a vertical seat in the draft bar 3 at the transverse center thereof and in line with the points $2^a$, is adapted to be passed through either of the seats 4—5 of the beam 1, to pivotally couple the said draft bar to the said bumper beam in different adjustments. As is evident, when the pin 6 is passed through the seat 4, the draft bar will be projected much farther beyond the front face of the bumper beam, than when the said pin is passed through the seat 5. This adjustment affords means for positioning the draft bar for proper coupling action under various different arrangements of couplers. It is, of course, evident that a greater number than two pin seats may be provided in the beam 1 or in the draft bar, so as to vary still further the number of possible adjustments of the draft bar.

To reduce the friction between the draft bar and the beam, and thereby make the longitudinal adjustments of the draft bar an easy matter when the coupling pin 6 is removed, an anti-friction roller 7 is mounted in the bottom of the draft bar seat 2. As shown, this roller 7 is in the form of a shaft having wheel-like rims for engagement with the bottom of the draft bar, and having projecting trunnions that are mounted in seats 8 formed in the bottom of the draft bar seat 2, as best shown in Fig. 3. At its extreme rear end, the draft bar shown is provided with a lock key 9 which prevents the draft bar from being drawn entirely out of the beam when the coupling pin 6 is removed. At its forwardly projecting end, the draft bar 3 terminates in vertically spaced ears 10 to which a coupler head (not shown), is adapted to be connected by means of a coupling pin (not shown).

A device of the kind described, is especially adapted for application to the front end of a locomotive, but may, of course, be applied to the rear end of the locomotive or to the ends of cars or tenders.

What I claim is:

1. The combination with a bumper beam, of a draft bar connected thereto with freedom for endwise adjustments transversely of said beam.

2. The combination with a bumper beam, of a draft bar connected thereto with freedom for lateral oscillatory movements and for endwise adjustments, substantially as described.

3. The combination with a bumper beam having at its central portion a seat that extends transversely therethrough, of a draft bar working in said seat, and means for adjustably securing said draft bar to said beam, substantially as described.

4. The combination with a bumper beam having at its central portion a transversely extended seat having diverging side walls, of a draft bar working in said seat, and means connecting said draft bar to said beam with freedom for longitudinal adjustments and for lateral oscillations, substantially as described.

5. The combination with a bumper beam having a transversely extended seat at its central portion, of a draft bar working in said seat, a roller or anti-friction device interposed between the bottom of said seat and the bottom of said draft bar, and means adjustably connecting said bar to said beam, substantially as described.

6. The combination with a hollow cast bumper beam having at its central portion a transversely extended draft bar seat formed with diverging side walls and several pin seats, of a draft bar working in said seat and provided with a pin seat, a roller interposed between the bottom of said draft bar and the bottom of said draft bar seat, and a coupling pin insertible through either of the pin seats in said beam and through the pin seat in said draft bar, to adjustably and pivotally connect said bar to said beam, substantially as described.

In testimony whereof I affix my signature in presence of two witnesses.

EDWIN C. WASHBURN.

Witnesses:
  MALIE HOEL,
  H. D. KILGORE.